Patented Apr. 26, 1949

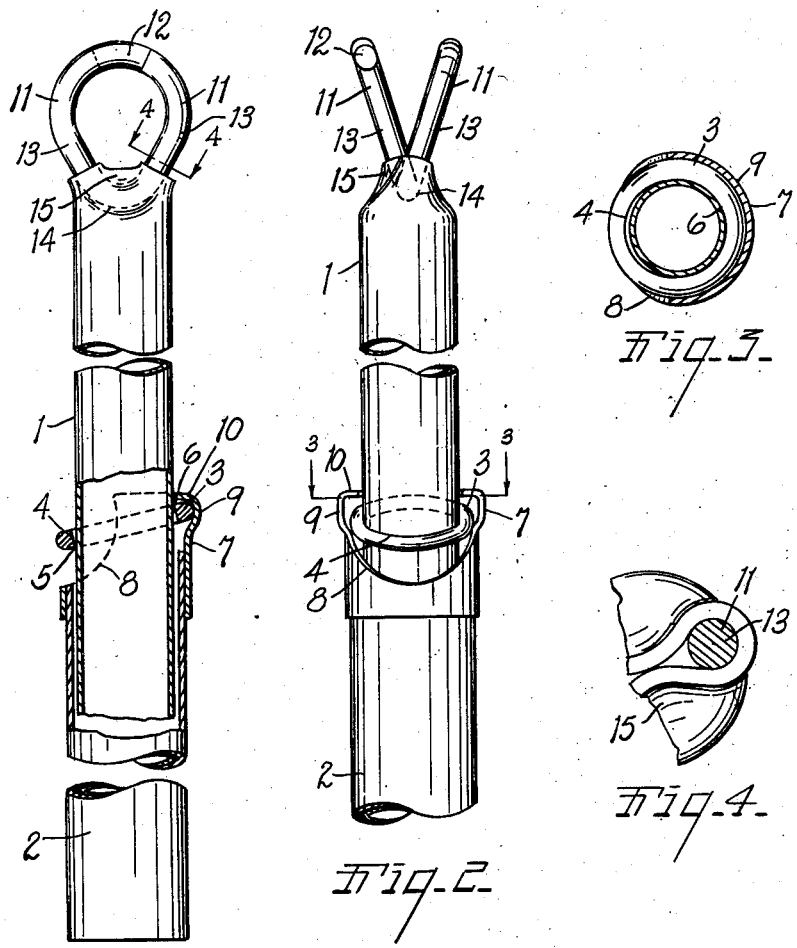

2,468,160

UNITED STATES PATENT OFFICE 2,468,160

CLOTHES POLE, STRUT, OR THE LIKE

Merle K. Benson, Benton Harbor, Mich., assignor to T-M-K Corporation, Davenport, Iowa, a corporation of Iowa Application May 25, 1945, Serial No. 595,842

4 Claims. (Cl. 248—353)

The main objects of this invention are:

First, to provide a clothes pole, strut or like support comprising telescoping sections which may be easily extended or adjusted to meet particular conditions, is very securely retained in its adjusted position, and at the same time may be easily collapsed.

Second, to provide a structure having these advantages which may be easily engaged with the clothes line and one in which the line is securely retained while permitting easy disengagement.

Objects pertaining to details of the invention will definitely appear from the description to follow. The invention is defined in the claims.

A structure embodying the features of the invention is clearly illustrated in the accompanying drawing, in which:

Fig. 1 is a fragmentary view partially in longitudinal section of a pole or strut embodying the invention.

Fig. 2 is a fragmentary view looking from the left of Fig. 1.

Fig. 3 is a transverse section on line 3—3 of Fig. 2.

Fig. 4 is a fragmentary view in section on line 4—4 of Fig. 1.

My improved clothes pole or strut comprises upper and lower tubular telescoping sections 1 and 2 which may be sections of drawn tubing of relative diameter, the upper member telescoping freely within the lower member; that is, the upper member is of such diameter relative to the lower member that it is not likely to become wedged or stuck therein as a result of possible corrosion or entry of foreign material. It will be understood that rust-proofing or rust-resisting treatment of both members is commercially desirable.

To secure the members in their relative adjusted position I provide an annular clutch member 3 of such internal diameter as to permit tilting or canting on the upper member to clutchingly engage the same as illustrated in Fig. 1. The clutch member preferably has a cylindrical inner periphery 4 resulting in sharp lower and upper edges 5 and 6. The clutch member is retained by means of the collar or sleeve-like retainer 7 which is sleeved upon the upper end of the lower pole member and brazed or soldered thereto. This retainer member is cut away at one side providing a recess 8, its other side being provided with a segmental bead-like enlargement 9 receiving the clutch member and permitting the swinging or canting adjustment thereof to and from clutching position. This enlargement terminates in an inturned flange 10 overhanging the clutch member and retaining it while permitting the free swinging movement thereof. The inturned flange 10 constitutes a stop for limiting upward canting of the annular clutch member 3 to facilitate manual adjustment of the pole members 1 and 2 telescopingly inwardly or outwardly relative to each other. When the annular clutch member 3 engages the flange 10, it lies in such a position that the pole member 1 may be readily moved in either direction therethrough.

When the upper member has been extended with the pole in upright position the clutch member automatically drops or swings to clutching position, although if desired it may be manipulated by the fingers of the operator to facilitate adjustment. Of course, it is necessary to swing the clutch members to releasing position to permit the telescoping of the pole members.

The upper pole member is provided with a line engaging means comprising a pair of oppositely disposed laterally diverging hooks 11, the bills 12 of the hooks being of such length that they overlap in space as shown in the drawing. The shanks 13 of the hooks are formed integrally and joined by the loop 14. This looped shank end is inserted with the upper end of the upper pole section and the walls of the pole section are clamped inwardly at 15 over the loop portion and to closely embrace the shank portions beyond the bight of the loop as shown in the drawing. This provides a strong and secure attachment for the hook to the upper pole member.

I have illustrated and described my invention in an embodiment especially designed as a clothes pole. It will be understood that it is adaptable for other uses where adjustable line supports are desired.

Having thus described my invention what I claim as new and desire to secure by Letters Patent is:

1. A pole or strut comprising upper and lower members, the upper telescoping within the lower, an annular clutch member loosely embracing the upper member to permit canting thereon to clutching engagement and having a cylindrical inner surface providing relatively sharp inner edges, a retainer member for said clutch member fixedly secured to the upper end of the lower pole member to project above the same, the projecting portion of said retainer member being cut away at one side and having a segmental bead-like enlargement on the other side loosely receiving said clutch member permitting the swinging thereof to and from clutching position, said annular clutch member being a rigid unitary structure and constituting the sole means on said retainer member for clutchingly engaging said upper telescoping member, said enlargement terminating in an inturned retainer flange for said clutch member, said flange constituting a stop to limit upward canting of said clutch member to a clutch releasing position to facilitate longitudinal adjustment of said upper and lower pole members relative to each other, said relatively sharp inner edges being disposed to clampingly engage opposite sides of the upper pole member.

2. A pole or strut comprising tubular upper and lower members, the upper telescoping within the lower, an annular clutch member loosely embracing the upper member to permit canting thereon to clutching engagement, a retainer member secured to the upper end of the lower pole member and loosely engaging one side of said clutch member permitting the canting thereof to clutchingly engage the upper pole member, and a pair of oppositely disposed laterally diverging hooks arranged with the bills thereof in spaced overlapping relation and having shanks integrally joined in a loop, the loop being disposed within the upper end of the upper member, the walls of the upper member being clamped upon the loop with the edges thereof closely embracing the shanks of the hooks and extending over the loop between the shanks.

3. A pole or strut comprising upper and lower members, the upper member telescoping within the lower, an annular clutch member loosely embracing the upper member to permit canting thereon to clutching engagement, and a retainer element at the upper end of the lower pole member, said retainer element including a housing spaced from and substantially concentric with the upper pole member for housingly retaining one side of the clutch member and permitting the canting of the member to bring the upper edge of its side engaged by said retainer member and the lower edge of its opposite side to clutchingly engage the upper pole member, said annular clutch member being a rigid unitary structure and constituting the sole means on said retainer element for clutchingly engaging the upper telescoping member.

4. A pole or strut comprising upper and lower pole members, the upper telescoping within the lower, an annular clutch member loosely embracing the upper member to permit canting thereon to clutching engagement, and a clutch retainer element at the upper end of the lower pole member, said retainer element including a housing spaced from and substantially concentric with the upper pole member for housingly retaining one side of the clutch member and permitting the canting thereof to clutching engagement with the upper pole member and permit easy release of the clutch member, said annular clutch member being a rigid unitary structure and constituting the sole means on said retainer element for clutchingly engaging the upper telescoping member.

MERLE K. BENSON.

REFERENCES CITED

The following references are of record in the file of this patent:

UNITED STATES PATENTS

| Number | Name | Date |
| --- | --- | --- |
| 81,310 | Tilton et al. | Aug. 18, 1868 |
| 427,642 | Wack | May 13, 1890 |
| 949,535 | Hamm | Feb. 15, 1910 |
| 1,130,831 | Madell | Mar. 9, 1915 |
| 1,845,143 | Friesner | Feb. 16, 1932 |
| 2,242,609 | Hammar | May 20, 1941 |